United States Patent [19]
Rooks

[11] Patent Number: 5,979,740
[45] Date of Patent: Nov. 9, 1999

[54] SOLDER WAVE HEIGHT SET-UP GAUGE

[76] Inventor: Bobby J. Rooks, 513 Sweetleaf Dr., Tampa, Fla. 33511

[21] Appl. No.: 09/034,860

[22] Filed: Mar. 4, 1998

[51] Int. Cl.[6] ..................................................... H05K 3/34
[52] U.S. Cl. ............................... 228/37; 228/56.5; 228/8; 228/33; 228/103
[58] Field of Search ................................ 228/37, 56.5, 8, 228/33, 103

[56] References Cited

U.S. PATENT DOCUMENTS

| | | | |
|---|---|---|---|
| 5,409,159 | 4/1995 | Connors et al. | 228/219 |
| 5,538,175 | 7/1996 | Massini et al. | 228/102 |
| 5,617,988 | 4/1997 | Willemen | 228/37 |
| 5,794,837 | 8/1998 | Cottingham et al. | 228/37 |
| 5,901,899 | 5/1999 | Flache | 228/37 |

*Primary Examiner*—Patrick Ryan
*Assistant Examiner*—M. Alexandra Elve

[57] ABSTRACT

An apparatus for measuring the height of a solder wave having a supporting horizontal member, at least one elongated pin slidably affixed to the horizontal member extending vertically downward. The elongated pins have a sensing means affixed to it and the sensing means communicate with and indicator means to notify a technician the height of a solder wave relative to the top surface of the solder pot. The elongated pins with sensors attached thereto are set up to notify a technician if the solder wave is too low, too high, or at an optimum level. A screw and nut provide height adjustment for the elongated pins.

11 Claims, 10 Drawing Sheets

SOLDER WAVE HEIGHT SET-UP GAUGE

BACKGROUND

1. Field of the Invention

Generally, this invention is directed towards an apparatus for manufacturing printed circuit boards and for assisting the process of soldering metals to integrated circuit boards. More specifically, this invention relates to a gauge device for measuring the height of a solder wave during setup that will provide more consistent soldering applications during the manufacturing process.

2. Description of the Prior Art

Generally, when a circuit board is prepared for soldering a multiplicity of component together, the circuit board is run through a device using a wave solder approach. The circuit board is placed onto a conveyor line whereby the circuit board is held by a plurality of gripping fingers. The circuit board is first carried through a fluxing bath, and then through an oven to prepare the components for soldering. The bottom face of the circuit board is then carried in contact with a wave-like flow of molten solder. All of the components are thereby soldered together with increased accuracy.

The problem occurs when the height of the solder wave that comes in contact with the circuit board is not at an optimum level. If the wave height is too high, solder will flow on the top surface of the circuit board and ruin the board or at least cause the circuit board to fail. If the height of the solder wave is too low, some of the components may not be soldered appropriately and the circuit board may fail or at least fail prematurely in time. Employees are often reprimanded if they adjust the height of the wave to high whereby the solder flow gets onto the top surface of the integrated circuit board. Thus many employees, tend to adjust the wave height too low thereby giving inconsistent solder to the bottom of the integrated circuit board. Thus, there is a higher failure rate for the circuit board under test functions.

Several approaches have been provided for solder wave measurements, in U.S. Pat. No. 5,538,175, "In a wave solder manufacturing process, a test device is used to measure the contact-area between a solder wave and a printed wiring board. In particular, the test device is a printed wiring board (PWB) that includes at least two arrays of electrical contact, one array near each side of the PWB. As the PWB make contact with a solder wave, the number of electrical contacts in each array that are grounded by the solder wave are counted and displayed on an alpha -numeric display mounted on top of the PWB."

In the art taught by Willemen, of U.S. Pat. No. 5,617,988, "The invention relates to a device for measuring the height of a solder wave in a soldering apparatus which comprises a solder bath and which is provided with at least one solder tower for generating a solder wave and a pump connected to the solder tower, wherein the measuring device comprises: means for measuring the liquid pressure in the connection between the pump and the solder tower. As a result of these steps, it is possible to measure accurately the pressure of the solder moving out of the pump to the solder tower. This pressure is in any case a good measure for the height of the solder wave."

While some of the prior art may contain some similarities relating to the present invention, none of them teach, suggest or include all of the advantages and unique features of a solder wave height set-up gauge as presented by the applicant's invention.

SUMMARY

The present invention is directed towards a set-up gauge device for wave solder machine. The device uses a multiplicity of vertical pins that extend downward from a horizontal supporting member. The end portions of the pins are measuring devices that come in contact with the wave solder and the top surface of the soldering pot. The pins are normally made of a non-wetting material thereby preventing solder from fusing to the pins themselves. At least two pins will differ in height; i.e. the end portions of the pins will extend downward vertically from the horizontal-supporting member at different distances. The object is to adjust the height of the solder wave above the top surface of the solder pot such that the wave surface will come in contact with the lower pin, and not contact the upper pin.

Accordingly, it is a general object of this invention to provide a device that will accurately solder the components of a printed circuit board.

Another object of this invention is to provide a device that will accurately a measure the height of a solder wave above the top surface of the solder pot using a multiplicity of vertically extended pins.

Still another object of this invention is to provide a multiplicity of pins that will signal and indicator when a sensing pin comes in contact with the solder wave.

Still yet another object of this invention is to provide a device that will have an indicator that will notify a technician whether the height of the solder wave is too low, too high, or at the optimum height.

A further object of this invention is to provide a device that will mount on the conveyor supporting members of the wave solder machine and provide a means for easy installation and removal.

Another object of this invention is to provide a device that will notify the technician that the horizontal member is in a level position.

Still yet, another object of this invention is to provide a wave height set-up gauge that will be automated whereby the height of the pins will be motor driven, and the sensor pin information will be processed by computer.

Other objects and a fuller understanding of the invention will become apparent from reading the following detailed Description of a preferred embodiment in conjunction with the accompanying drawings.

BRIEF DESCRIPTION OF THE DRAWINGS

This invention, together with other objects, features, aspects and advantages thereof, will be more clearly understood from the following description, considered in conjunction with the accompanying drawings.

Ten sheets of drawings are furnished, sheet one contains FIG. 1, sheet two contains FIG. 2, sheet three contains FIG. 3, sheet four contains FIG. 4, sheet five contains FIG. 5, sheet six contains FIG. 6, sheet seven contains FIG. 7, sheet eight contains FIG. 8, sheet nine contains FIG. 9, and sheet ten contains FIG. 10.

LIST OF ELEMENTS

1. SOLDER WAVE HEIGHT SET-UP GAUGE
2. THREADED ROD
3. LOCKING NUT
4. HIGH INDICATOR
5. LOW INDICATOR
6. WAVE HEIGHT INDICATOR
7. GO INDICATOR
8. GLASS LEVELING TUBE
9. HORIZONTAL SUPPORTING MEMBER
10. VERTICAL SUPPORTING RODS
11. PIN MEMBER
12. PIN MEMBER
13. SENSING PIN
14. SENSING PIN
15. GLASS LEVELING BUBBLE
16. GLASS LEVELING HOUSING
17. CONVEYOR SUPPORTING MEMBER
18. SUPPORTING FINGERS
19. FINGER GROOVES
20. CIRCUIT BOARD
21. HIGH SOLDER WAVE HEIGHT
22. OPTIMUM SOLDER WAVE HEIGHT
23. LOW SOLDER WAVE HEIGHT
24. ELECTRICAL CONNECTION
25. ELECTRICAL CONNECTION
26. MOTOR AND GEAR DRIVEN SYSTEM
27. FRONT SURFACE OF HORIZONTAL SUPPORTING MEMBER
28. EXPOSED THREADED ROD
29. TIP OF LOW SENSING PIN
30. TIP OF HIGH SENSING PIN
31. HOUSING FOR SOLDER POT PIN
32. THREADED ROD FOR SOLDER POT HEIGHT SENSING PIN
33. SOLDER POT PIN
34. LOWER PORTION OF SOLDER POT PIN
35. TIP OF SOLDER POT PIN
36. COMPUTER SYSTEM
37. SOLDER POT
38. SURFACE OF SOLDER WAVE
39. TOP SURFACE OF SOLDER POT
40. OVERFLOW SOLDER WAVE
41. HORIZONTAL ADJUSTMENT SLOT
42. HOUSING FOR SOLDER POT PIN

DESCRIPTION OF THE PREFERRED EMBODIMENTS

Figure 1:
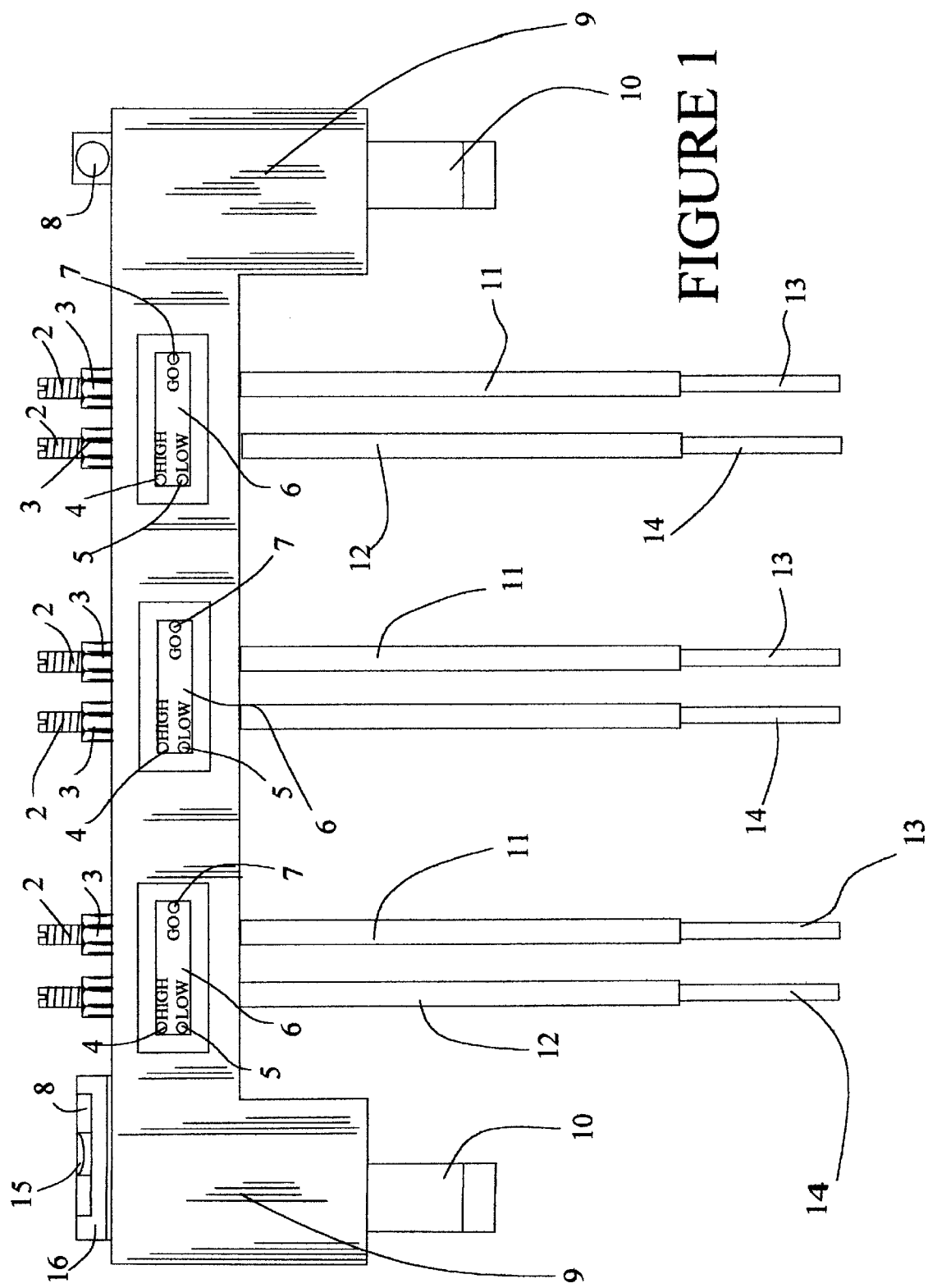
FIG. 1 shows a front side view of the wave height set-up gauge having a multiplicity of pins extending vertically. The end or bottom portions of the pins are sensing devices that signal an indicator if the sensing devices are in contact with the solder wave. The front face of a horizontal supporting member houses a multiplicity of indicators for communicating to a technician the height of the solder wave.

Referring now to FIG. 1, a solder wave height set-up gauge for measuring the height of a solder wave above the top surface of a solder pot is generally shown by reference number 1. The invention generally consist of a horizontal supporting member 9, a plurality of pins 11 and 12, a plurality of sensors 13, and 14, and at least one indicator 6. The present invention deals primarily with set-up of a solder wave machine and is presently not intended for real-time measuring. This is not a problem, however, because after the height of the solder wave is set at the optimum level 22, the wave level remains stable throughout that particular production run and will not varying significantly. The height of difference between sensors will determine the accuracy of the solder wave height 38 relative to the top surface 39 of the solder pot 37.

FIGS. 1–3, and 10 show the front face or side of the horizontal member 9 having three indicators 6 for signaling to a technician whether the height of the solder wave is too low, too high, or at the optimum level. The indicators 6 have a low indicator 5, a high indicator 4, and an optimum indicator 7, which reads "GO". At the top surface of the horizontal member 9, the elongated pins 11 and 12 extend through the member 9 thereby exposing a threaded rods 2 and locking nuts 3. The pins 11 and 12 extend vertically downward through the member 9, and extend a given distance below the horizontal member 9. This distance is determined by the height of the conveyor supporting members 17 and the top surface of the solder pot 37. At the bottom ends of the pin 11 and 12 are sensors 13, and 14 for indicating whether a solder wave is too high or too low respectively. The sensors 13 and 14 and pins are made of a non-wetting material (i.e. they do not fuse with the molten solder material). Note, this system of pins and sensors is intended to be pre-set for a particular wave height application and quickly removed after set-up.

Figure 2:
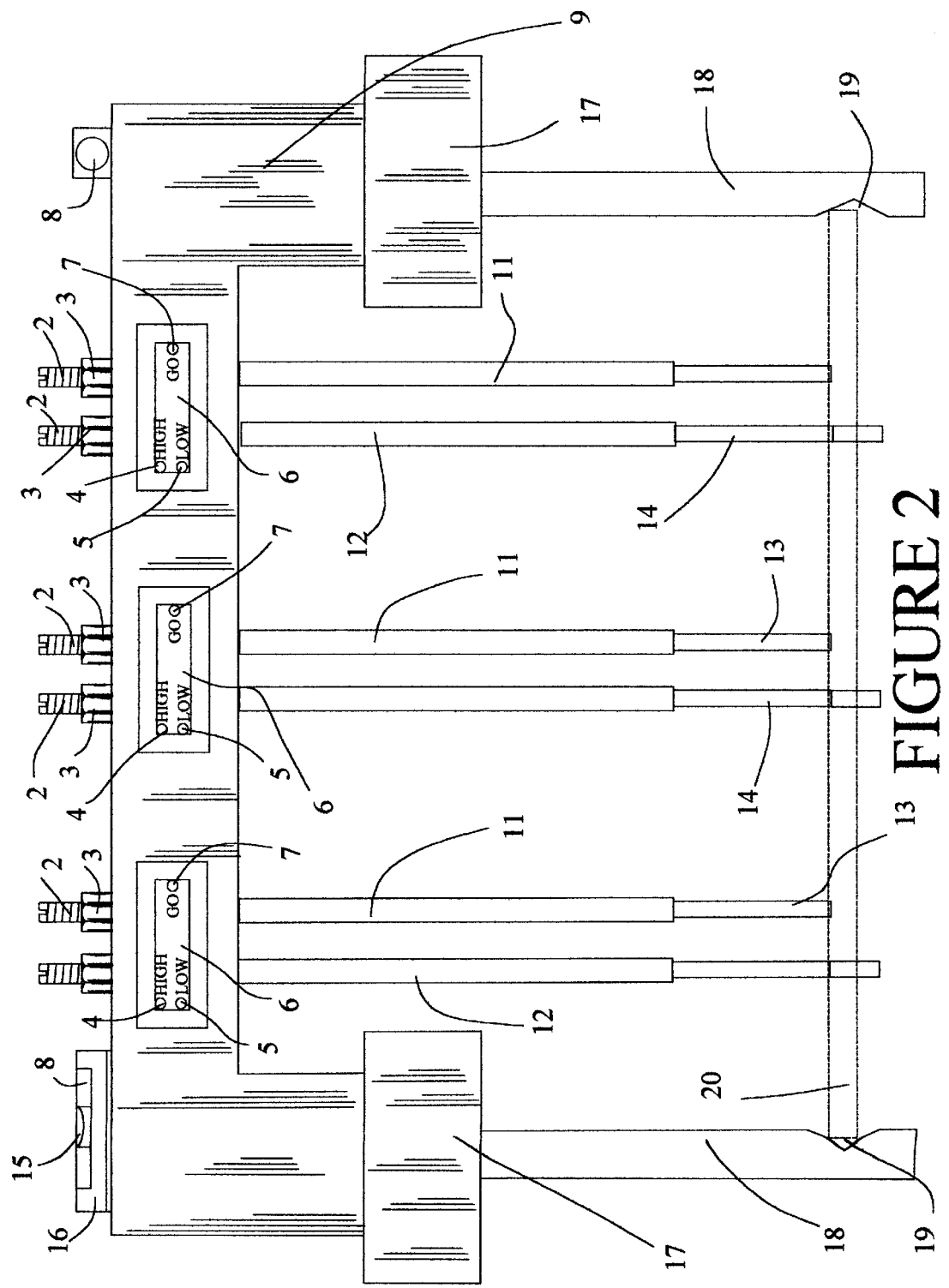
FIG. 2 shows a front side view of the wave height set-up gauge mounted on the supporting members of a circuit board conveyor. A printed circuit board is shown held between supporting fingers and the sensing pins are adjusted accordingly.

FIG. 2 shows a circuit board 20 with a given thickness held between grooves 19 of supporting conveyor fingers 18. The pins are adjusted appropriately as shown to determine the optimum height 22 of the solder wave before a production run. Note, the differences in sensor height are exaggerated in the figure for clarity only. If the height of the solder wave is too high 21, (i.e. above the sensor 13), it is probable that the solder will flow onto the top surface of the circuit board potentially ruining every circuit board coming through the conveyor system. If the height of the solder wave is too low 23, (i.e. below the sensor 14), it is probable that the solder wave will not sufficiently contact the exposed electrical components to be soldered and the circuit board will fail to operate. In addition, a circuit board 20 may fail prematurely over time if the circuit board components are not soldered with an adequate amount of solder.

Figure 3:
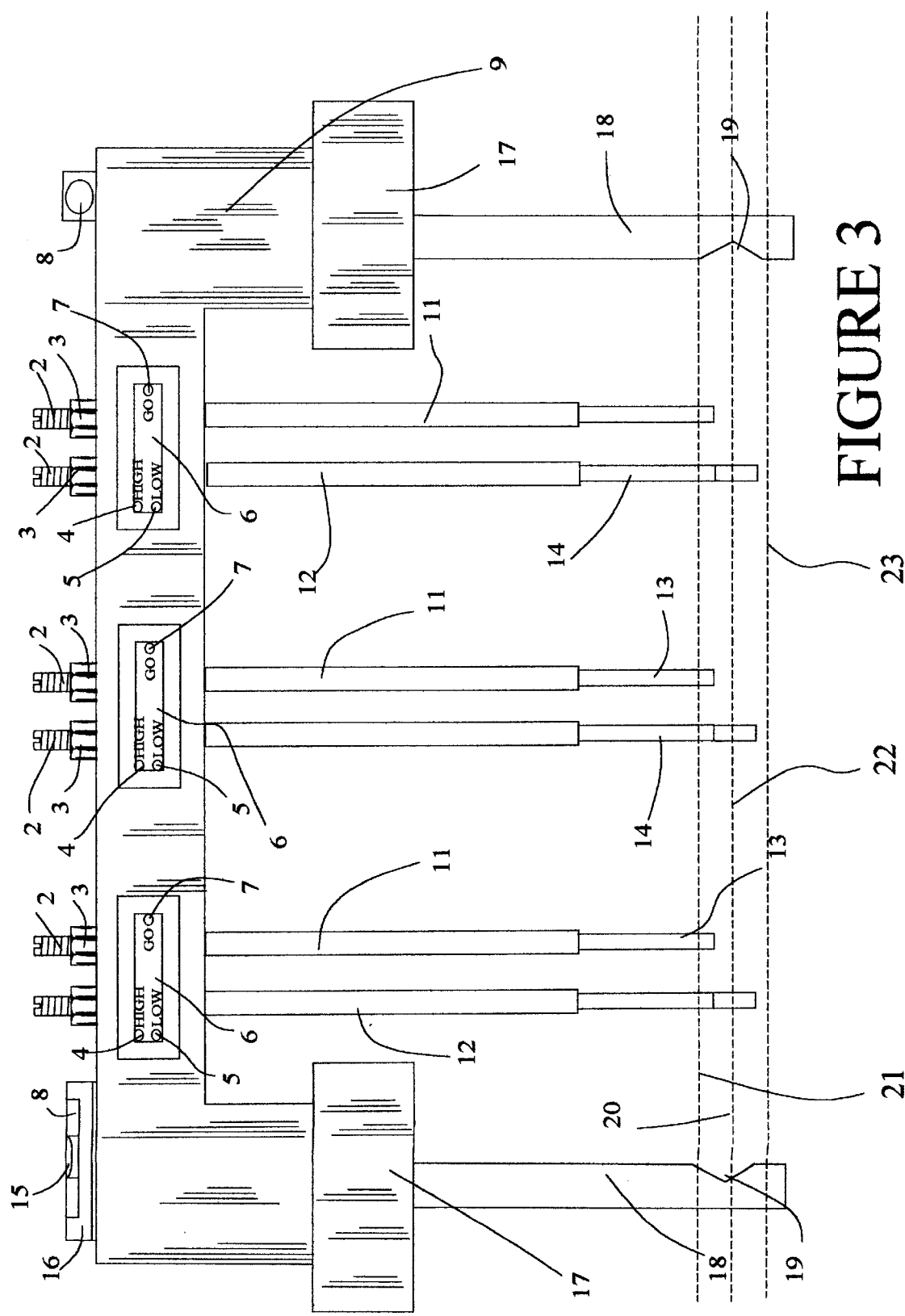
FIG. 3 shows a front side view of the wave set up gauge with the sensing pins extending vertically downward to measure the height of a solder wave. The figure displays three varying wave heights, with one wave shown too high, one wave shown too low, and the middle wave shown at the optimum height.

FIG. 3 shows the different solder wave heights that will trigger the indicator 6 to indicate the status of the solder wave. Having a plurality of sensors arranged horizontally across the horizontal member 9 will determine or measure the height of the solder wave horizontally across the wave. Note, the build-up of dross (i.e. oxidized solder) may clog the internal screen or baffle of a solder pot, and sometimes can lead to an irregular or non uniform solder wave. If the solder wave is not uniform in height across its span, this may be an indication that the solder pot screen or baffle needs to be removed and replaced with a clean screen. In addition, FIG. 1 shows a vertical supporting rod 10 that fits into the conveyor support members 17 and allows the horizontal member 9 to be easily affixed to the conveyor support members 17. At the top side of the member 9 are bubble level indicators 16 to assure that the horizontal supporting member 9 is level. This is necessary for assuring that each sensor is horizontally parallel to each other.

Figure 4:
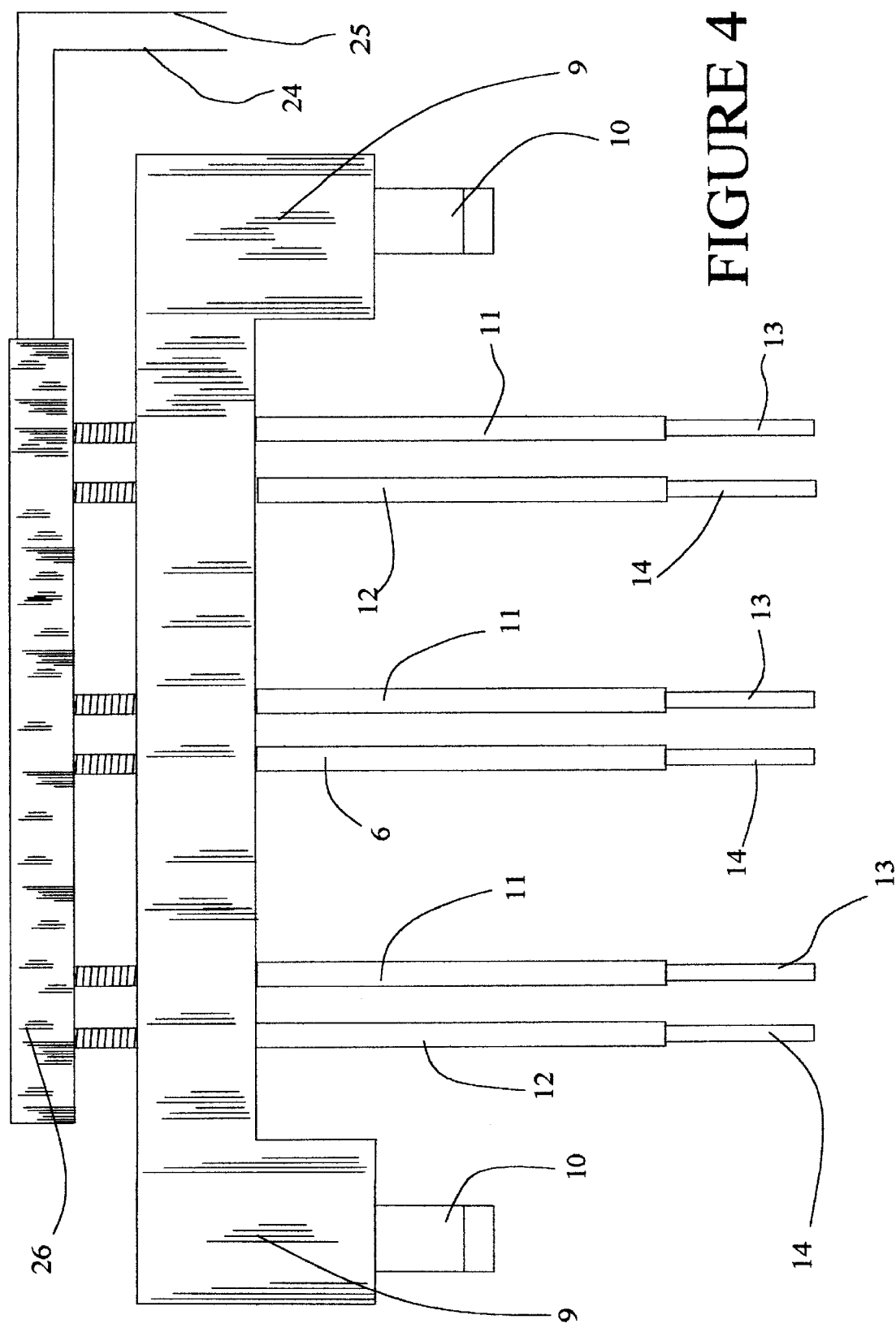
FIG. 4 shows a front side view of the wave set up gauge with the sensing pins extending vertically downward to measure the height of a solder wave. The sensing pins in this figure are controlled by an automated gear system that can adjust the height of the pins automatically. The sensing pins in this figure transfer the information to a computer system that will notify a technician if the height of the wave needs to be adjusted.
Figure 5:
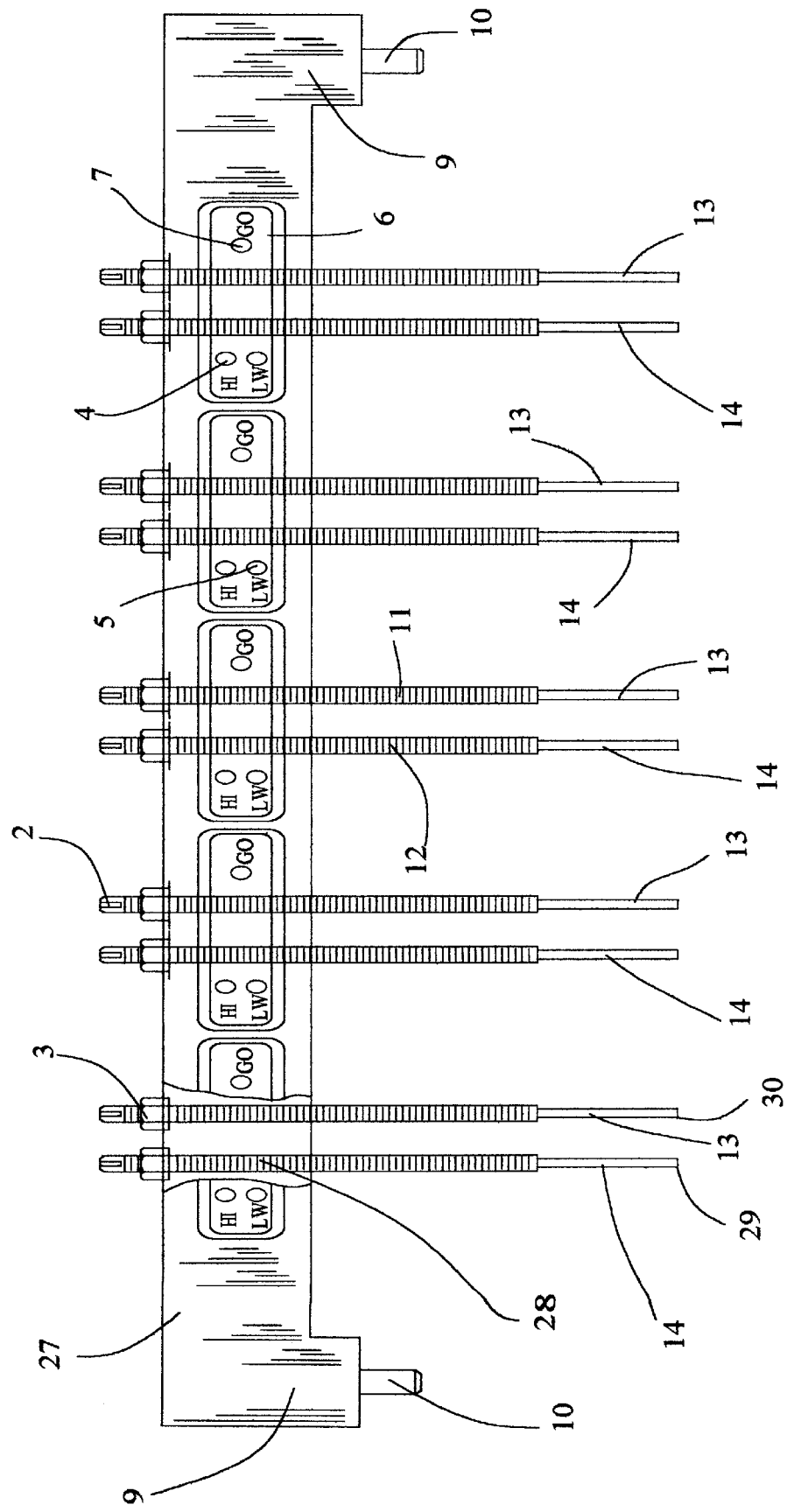
FIG. 5 shows a side cut-away view of the wave height set-up gauge having a multiplicity of pins extending vertically. This figure simply shows how the pins extend through the horizontal supporting member and are threaded at one end for height adjustment via adjustment nuts.
Figure 8:
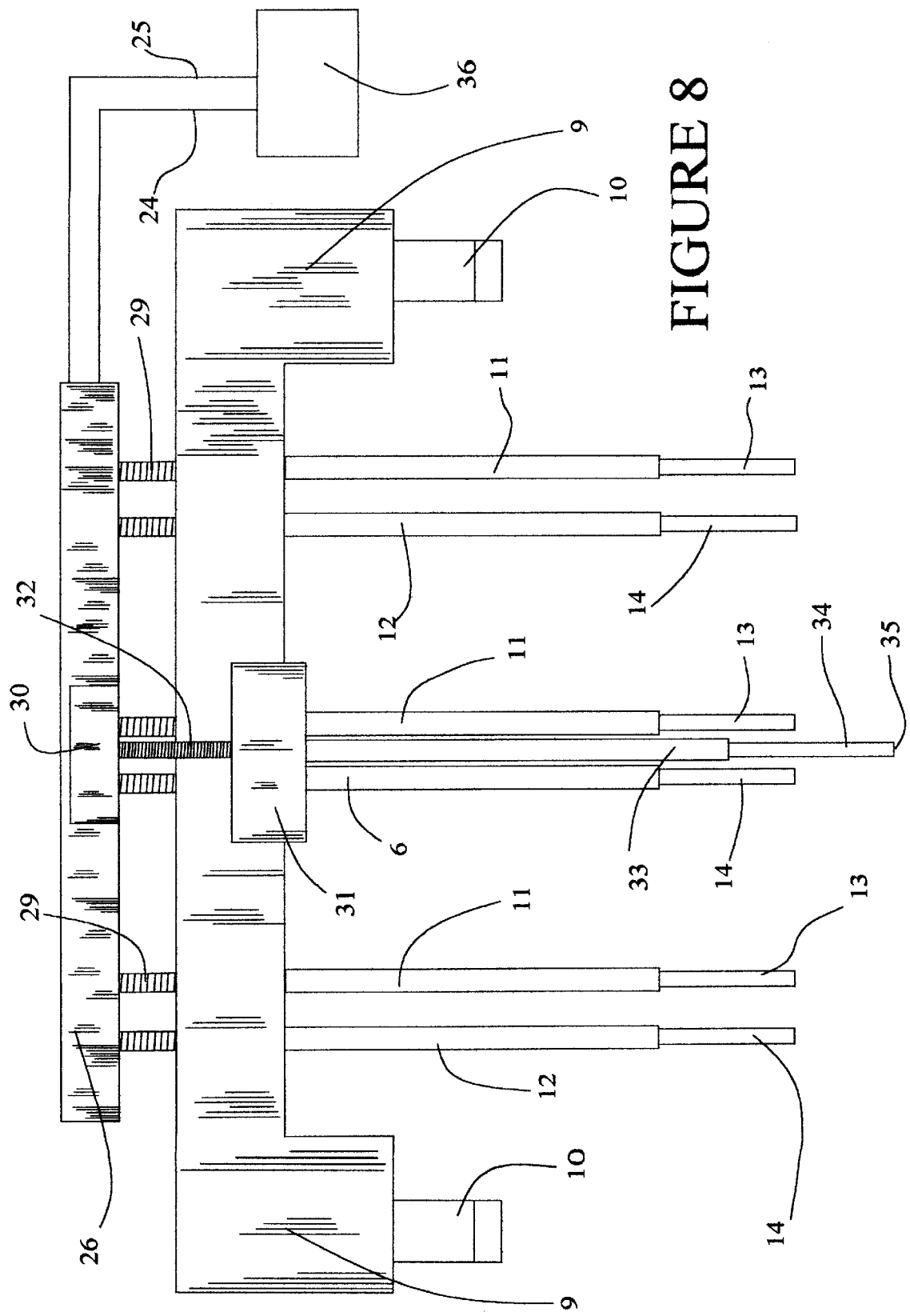
FIG. 8 shows a front side view of the wave set up gauge with the sensing pins extending vertically downward to measure the height of a solder wave. The sensing pins and the solder pot height pin are controlled by an automated gear system that can adjust the height of the pins automatically. The sensing pins and solder pot height pin transfer the information to a computer system that will notify a technician if the height of the wave needs to be adjusted.

FIGS. 4 and 8 show an automated motorized adjustment mechanism 26, 31, and 32 that adjust the height of the pins 13 and 14 automatically, with the information from the sensors sent to a computer system 36 for analysis. This system allows for one apparatus to replace all of the individual gauges and eliminates the need for on-site inspection of the indicators 6. A technician will be notified by computer if the solder wave height 38 needs to be adjusted.

Figure 6:
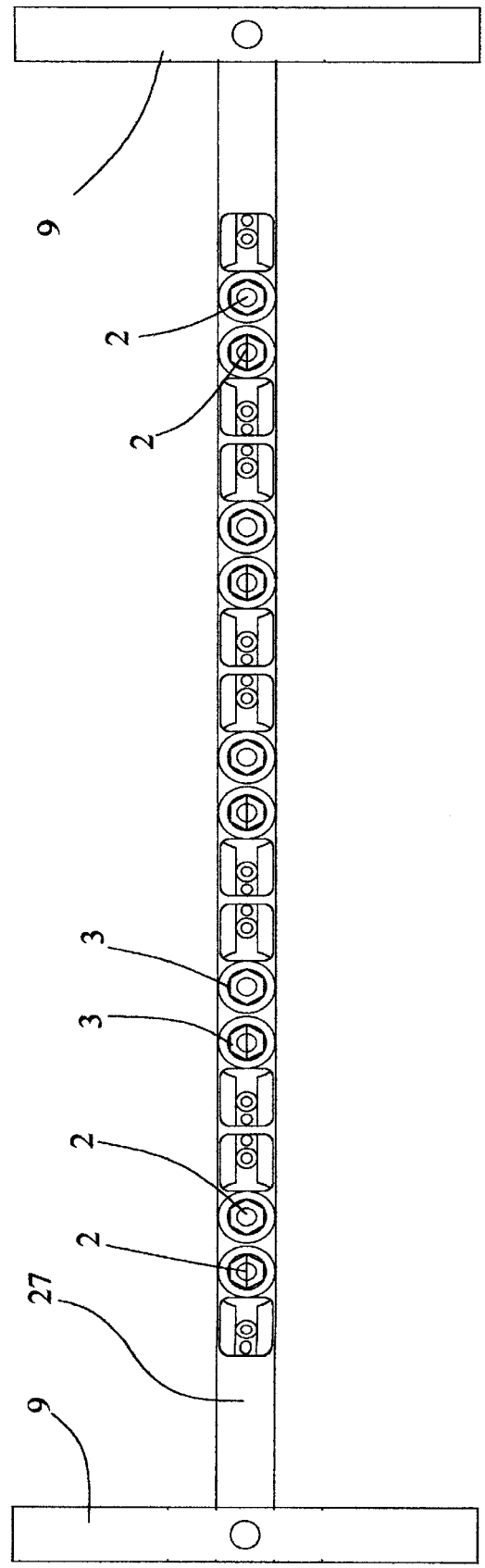
FIG. 6 shows a top view of the horizontal supporting member and the adjustment nuts that adjust the height of the pins. An additional horizontal member is shown for added structural support.
Figure 7:
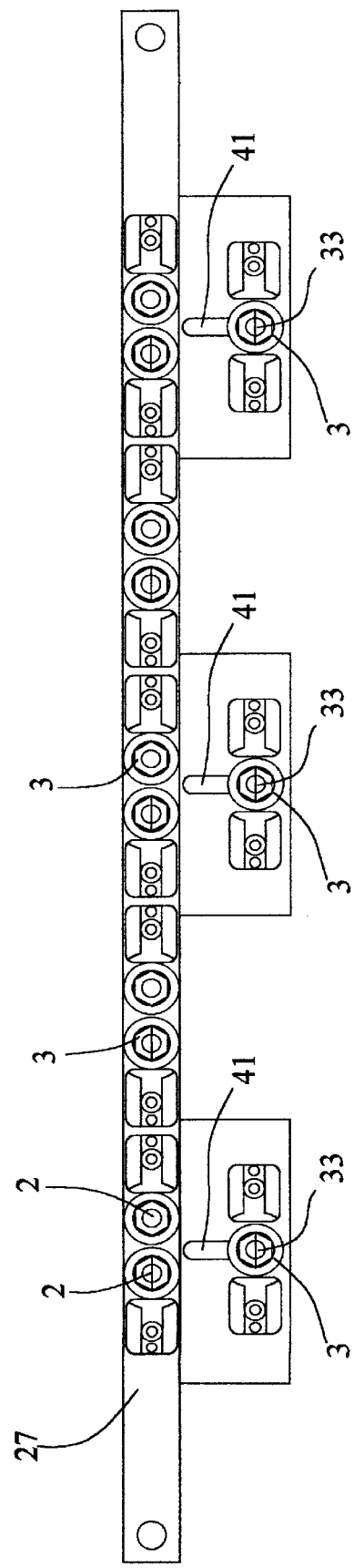
FIG. 7 shows a top view of the horizontal supporting member and the adjustment nuts that adjust the height of the pins; the additional horizontal member is not shown in this figure. A plurality of pins are shown affixed to the horizontal supporting member to measure the distance to the top surface of the solder pot. The solder pot measuring pins extend horizontally or protrude from the horizontal supporting member.

FIGS. 6 and 7 show a top view of the horizontal member 9 having a plurality of threaded rods and pins exposed at the top. The objects surrounding the pins are thermal protectors for the electrical connections that are made between the sensors and the indicators 6. FIG. 7 shows additional protruding members 42 affixed to member 9 and supporting solder pot pins 33. A horizontal adjustment slot 41 is provided to allow the solder pot pins 33 to adjust horizontally.

Figure 9:
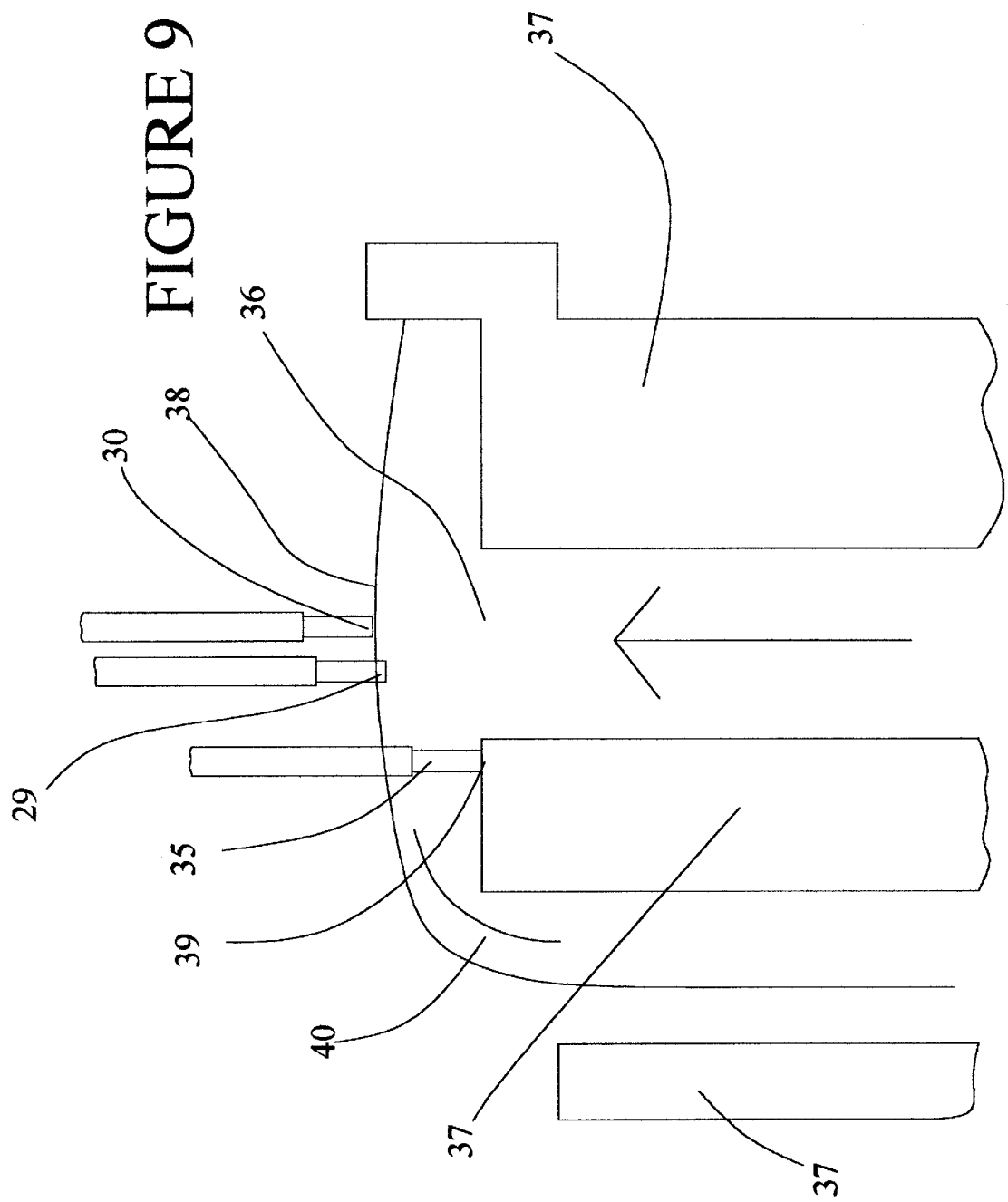
FIG. 9 shows a side view of a top opening of a solder pot with the solder wave flowing outward at a given height relative to the top surface of the solder pot. The solder pot height pin is shown in contact with the top surface of the solder pot, and the height of the solder wave is shown at the optimum level between the two sensing pins.
Figure 10:
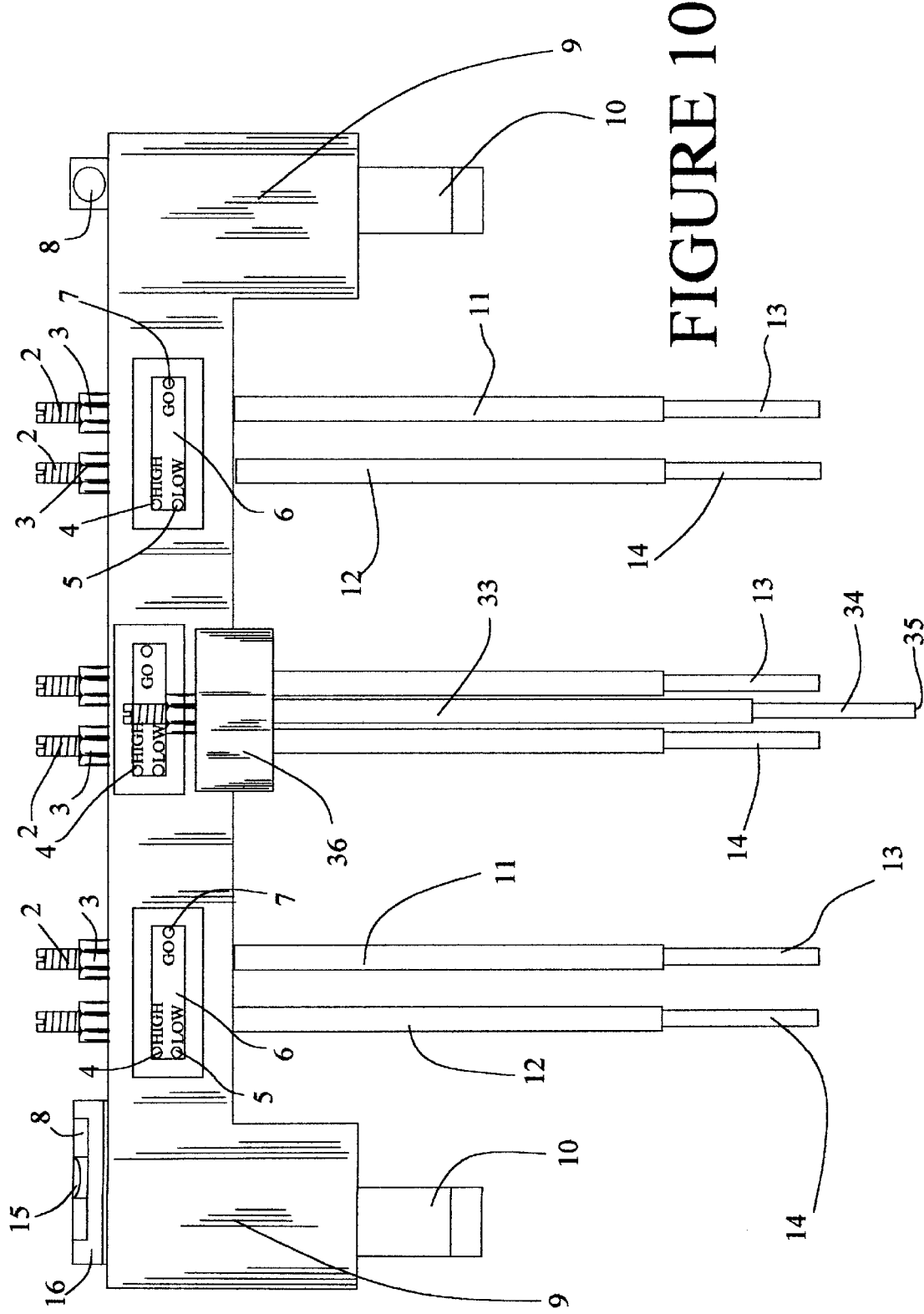
FIG. 10 shows a front side view of the wave height set-up gauge having a multiplicity of pins extending vertically. The end or bottom portions of the pins are sensing devices that signal an indicator if the sensing devices are in contact with the solder wave. The front face of a horizontal supporting member houses a multiplicity of indicators for communicating to a technician the height of the solder wave. An additional vertical pin is shown affixed to the front side of the horizontal supporting member, this pin is used for measuring the height of the top surface of the solder pot.

FIG. 9 shows a solder wave 38 flowing out of the mouth 36 of the solder pot 37 and the solder over flow 40 flowing back into the solder pot 37. The solder pot pin 33 is shown with the sensor 35 touching the top surface 39 of the solder pot. The low and high sensors 29 and 30 in the figure are shown adjusted at a given height above the solder pot sensor 35. The solder wave 38 in the figure is shown adjusted to the optimum height for a production run, (i.e. between the low and high sensor 29 and 30 respectively). The solder pot pins 33 should come in contact with the surface of the solder pot 39 at the highest point of the solder pot. This will determine the relative height of the solder wave 38 with respect to the surface height of the solder pot 39.

Since minor changes and modifications varied to fit particular operating requirements and environments will be understood by those skilled in the art, the invention is not considered limited to the specific examples chosen for purposes of illustration, and includes all changes and modifications which do not constitute a departure from the true spirit and scope of this invention as claimed in the following claims and reasonable equivalents to the claimed elements.

What is claimed is:

1. An apparatus for measuring the height of a solder wave, said apparatus comprising:
    (a) a horizontal member having a front side, a top side, a bottom side, and a rear side,
    (b) at least one elongated pin slidably affixed to said horizontal member, said pin extending downward in a substantially vertical fashion from said horizontal member a given distance,
    (c) at least one sensing means affixed to said elongated pin,
    (d) at least one indicator means communicating with said sensing means.

2. An apparatus for measuring the height of a solder wave during set up as set forth in claim 1, wherein said elongated pin having a bottom end, said sensing means affixed to said bottom end.

3. An apparatus for measuring the height of a solder wave during set up as set forth in claim 1 wherein said indicator having a low indicator, a high indicator, and an optimum indicator for indicating whether a solder wave height is too low, too high, or at the optimum height respectively.

4. An apparatus for measuring the height of a solder wave during set up as set forth in claim 2 wherein said apparatus further having a means of adjusting the height of said elongated pins.

5. An apparatus for measuring the height of a solder wave during set up as set forth in claim 4 wherein said means of height adjustment comprising of a threaded rod and nut.

6. An apparatus for measuring the height of a solder wave during set up as set forth in claim 1 wherein said sensing means is electrical activated.

7. An apparatus for measuring the height of a solder wave during set up as set forth in claim 1 wherein said sensing means is thermally activated.

8. An apparatus for measuring the height of a solder wave during set up as set forth, in claim 1 wherein said horizontal member having a means of affixing said member to at least one conveyor support member.

9. An apparatus far measuring the height of a solder wave during set up as set forth in claim 1 wherein said horizontal member having a leveling indicating means affixed thereto.

10. An apparatus for measuring the height of a solder wave during set-up as set forth in claim 1 wherein said horizontal member having a protruding horizontal member affixed to one side, said protruding member having an elongated pin affixed thereto for measuring the height from a soldering pot.

11. An apparatus for measuring the height of a solder wave during set-up as set forth in claim 10 wherein said protruding horizontal member further having a slot for horizontal adjustment of said elongated pin.

* * * * *